United States Patent

Schwab et al.

Patent Number: 5,183,709
Date of Patent: Feb. 2, 1993

[54] ACICULAR COBALT-MODIFIED IRON OXIDES AND THEIR PREPARATION

[75] Inventors: Ekkehard Schwab, Neustadt; Ronald J. Veitch, Ludwigshafen; Helmut Auweter, Limburgerhof, all of Fed. Rep. of Germany

[73] Assignee: BASF Aktiengesellschaft, Ludwigshafen, Fed. Rep. of Germany

[21] Appl. No.: 507,765

[22] Filed: May 21, 1990

[30] Foreign Application Priority Data

Apr. 20, 1989 [DE] Fed. Rep. of Germany ....... 3912976

[51] Int. Cl.$^5$ .................................................. B32B 5/16
[52] U.S. Cl. ............................ 428/404; 428/403; 252/62.56
[58] Field of Search ............................ 428/403, 404; 252/62.56

[56] References Cited

U.S. PATENT DOCUMENTS

| | | | |
|---|---|---|---|
| 3,573,980 | 4/1971 | Haller et al. | 427/48 |
| 4,122,216 | 10/1978 | Okazoe | 428/403 |
| 4,287,233 | 9/1981 | Rudolf | 427/127 |
| 4,406,694 | 9/1983 | Mishima et al. | 252/62.59 |
| 4,414,245 | 11/1983 | Miyazawa et al. | 427/127 |
| 4,539,261 | 9/1985 | Nakata et al. | 428/403 |
| 4,686,142 | 8/1987 | Kiemie et al. | 428/403 |
| 4,713,261 | 12/1987 | Masaki et al. | 427/129 |
| 4,770,903 | 9/1988 | Schwab et al. | 4276/128 |

FOREIGN PATENT DOCUMENTS 1441185 6/1976 United Kingdom .

OTHER PUBLICATIONS

J6 0196-905-A, Fuji Photo Film KK, Japanese Abstract.

Primary Examiner—Paul J. Thibodeau
Assistant Examiner—Mark A. Formos
Attorney, Agent, or Firm—Keil & Weinkauf

[57] ABSTRACT

Acicular, cobalt-modified iron oxides consisting of a core of an iron oxide of the formula $FeO_x$ where x is from 1.33 to 1.5 and a ferrite shell which contains a total amount of from 0.4 to 12% by weight of cobalt ions and not more than 5% by weight of iron(II) ions, the percentages being based on the total amount of the material, which iron oxides have improved aging resistance, particularly with regard to the coercive forces, and a process for their preparation.

2 Claims, 4 Drawing Sheets

ACICULAR COBALT-MODIFIED IRON OXIDES AND THEIR PREPARATION

BACKGROUND OF THE INVENTION

The present invention relates to acicular, cobalt-modified iron oxides, consisting of a core of an iron oxide of the formula $FeO_x$ where x is from 1.33 to 1.5 and a ferrite shell which contains a total amount of from 0.4 to 12% by weight of cobalt ions and not more than 5% by weight of iron(II) ions, the percentages being based on the total amount of the material, and which have improved aging resistance, particularly with regard to the coercive force, and a process for their preparation.

Cobalt-modified, acicular gamma-iron(III) oxide has been used for a long time and in large amounts as magnetizable material in the production of magnetic recording media. The thermal and mechanical instability of residual induction and coercive force originally associated with cobalt doping of iron(III) oxide was substantially reduced when, instead of uniform volume doping, doping was effected in such a way that the cobalt is present in the form of a magnetic cobalt compound in an outer shell on an essentially cobalt-free core of iron-(III) oxide or berthollide iron oxides. Several processes have been described for the preparation of such pigments having a layer structure. These processes essentially involve the application of a cobalt-containing compound to magnetic acicular iron oxide and subsequent heating of the coated oxides, as described in, for example, GB-B 1 441 185 or U.S. Pat. No. 3 573 980. However, if it is intended to avoid the disadvantages of volume doping described above, only limited increases in the coercive force can be achieved using these processes. Application of a mixture of Fe(II) hydroxide and Co hydroxide with simultaneous oxidation of the coating is also known (DE-A 22 35 383). Although the coercive force can be increased to a greater extent by this method, relatively large amounts of cobalt are required for this purpose and the degree of utilization of the cobalt is therefore low. Furthermore, EP-A 14 902 and EP-A 14 903 disclose that a mixture of Fe(II) hydroxide and Co hydroxide can be applied to the gamma-iron(III) oxide with simultaneous introduction of inert gas in order to prevent oxidation of the divalent iron. The coercive force can be increased to a greater extent with a lower cobalt content by this process. However, particularly pronounced core/shell structures of the particles prepared in this way are not achieved, so that the disadvantages described in connection with volume doping once again occur, particularly in the case of pigments having a relatively high coercive force. This is due to the fact that the high Fe(II) concentrations required for high coercive forces in this process greatly accelerate diffusion of the cobalt into the interior of the particle.

Pigments having a particularly pronounced core-/shell structure can be obtained if a process described in U.S. Pat. No. 4,770,903 is used. In this process, the gamma-iron oxide used for coating is first coated with $Fe(OH)_2$ under inert gas in order to form a magnetite-like surface layer, on which cobalt ferrite is crystallized in the second step under oxidizing conditions at low temperatures.

Regardless of the particular, more or less advantageous preparation process, however, all cobalt-doped iron oxides tend to undergo changes, usually a decrease in the coercive force, if the pigment powders are stored for a long time. To improve this property, JP-A 60 196 905 proposed coating cobalt-modified iron oxides with alkyl- or alkenylsilanes. However, the stated compounds are insoluble in water, so that the pigment to be coated has to be first dried and then redispersed in organic solvents. On the other hand, DE-A 32 28 021 proposes hydrothermal aftertreatment for improving the long-term stability of cobalt-doped iron oxides. However, this entails a very expensive process. Finally, DE-A 33 12 243 states that coating with Mn, Zn or V compounds has a stability-improving effect, but does not specify this in any more detail.

It is an object of the present invention to provide a cobalt-doped iron oxide which has long-term stability, and a simple process for its preparation.

SUMMARY OF THE INVENTION

We have found that the object of the invention is achieved by acicular, cobalt-modified iron oxides consisting of a core of an iron oxide of the formula $FeO_z$ where x is from 1.33 to 1.5 and a ferrite shell which contains a total amount of from 0.4 to 12% by weight of cobalt ions and not more than 5% by weight of iron(II) ions, the percentages being based on the total amount of the material, which iron oxides have an isoelectric point corresponding to pH $\leq 6.5$ and exhibit a decrease in the coercive force of less than 5% after storage in air for 21 days at 50° C.

These novel materials are prepared in a particularly advantageous manner by a method in which an acicular, cobalt-modified iron oxide, consisting of a core of an iron oxide of the formula $FeO_z$ where x is from 1.33 to 1.5 and a ferrite shell which contains a total amount of from 0.4 to 12% by weight of cobalt ions and not more than 5% by weight of iron(II) ions, the percentages being based on the total amount of the material, is dispersed in water, a dilute solution of an alkli metal silicate containing not more than 1% by weight of silicon based on the iron oxide to be treated, is then added to the vigorously stirred suspension and the resulting material is filtered off, washed with water and dried in an inert as atmosphere.

The iron oxide used in this novel process and having a ferrite shell is advantageously obtained by a method in which acicular iron oxide of the formula $FeO_z$ where x is from 1.33 to 1.5 is suspended in water, an iron(II) salt solution is added to the suspension and an iron(II) hydroxide precipitate is deposited in an amount of from 2 to 6% by weight, based on the iron oxide used, of iron ions on the said iron oxide under an inert gas atmosphere at from 5° to 60° C. by adding an alkali. A solution containing iron(II) ions and cobalt ions is then added to the suspension and the corresponding hydroxides are precipitated onto the material present in the suspension by means of an alkali at from 5° to 60° C. under an inert gas. Thereafter, the precipitate is oxidized at from 5° to 35° C. by passing in air, and finally the ferrite shell is formed by heating the suspension at from 35° to 95° C. in an inert gas atmosphere. The resulting end product can be isolated, but the novel process can also be carried out directly in the suspension obtained.

To test their long-term stability, the after-treated dry novel iron oxide powders are subjected to an accelerated aging test at 50° C. in the air. From time to time, samples are taken from these powders and their magnetic properties are determined using a vibrating sample magnetometer. The measurement is effected at a field strength of 380 kA/m, the coercive force Hc being stated in [kA/m], converted to a tap density of P=1.2 g/cm$^3$. The specific surface area $S_{N2}$ according to DIN 66,132 was also determined using a Ströhlein areameter from Ströhlein, Düsseldorf, FRG, by the one-point difference method of Haul and Dümbgen.

The isoelectric point of the novel iron oxide powders was determined using an Automated Electrokinetics Analyzer (Model 3000 from PEN KEM, Bedford Hills N.Y., USA). For this purpose, the powders are dispersed in water in a concentration of 0.1 g/l by ultrasound. The pH is adjusted with HCl or NaOH in a range which is typically pH 2 to pH 12. The electrophoretic mobility measured using the Automated Electrokinetics Analyzer is from about +4 to −4 (μm/sec)/(V/cm) for the cobalt-modified iron oxides. The pH at which the electrophoretic mobility assumes the value zero is the isoelectric point.

The Examples which follow illustrate the invention without restricting it.

EXAMPLE 1

5 kg of gamma-Fe$_2$O$_3$ ($S_{H2}$=40.8 m$^2$/g, Hc=26.2 kA/m) were dispersed in 40 l of water. The dispersion was brought to a pH of >12 with 4 l of concentrated NaOH and then heated to 50° C. while passing in nitrogen. At this temperature, 995.5 g of FeSO$_4$.7H$_2$O, dissolved in 12 l of water, were metered in with further passage of nitrogen. The mixture was kept at this temperature for 1 hour while blanketing with N$_2$.

It was then cooled to 35° C., and 1191 g of FeSO$_4$.7H$_2$O and 906.8 g of CoSO$_4$.7H$_2$O were added. A change-over was made to gassing with air while further cooling to room temperature, and oxidation was carried out for a total of 3 hours. Thereafter, stirring was continued for a further hour under nitrogen at room temperature, after which the dispersion was filtered through a chamber membrane filter press and was washed with water at 60° C.

127 g of this filter cake containing about 50% by weight of residual moisture were redispersed in 500 ml of water, after which 5.25 g of waterglass containing 26.5% by weight of SiO$_2$, dissolved in 50 ml of water, were added. The resulting dispersion was stirred for a further 15 minutes, after which the solid was filtered off and was dried under nitrogen.

The powder obtained is characterized by the following data:
Hc: 53.3 kA/m;
$S_{N2}$: 38.0 m$^2$/g.

Figure 1:
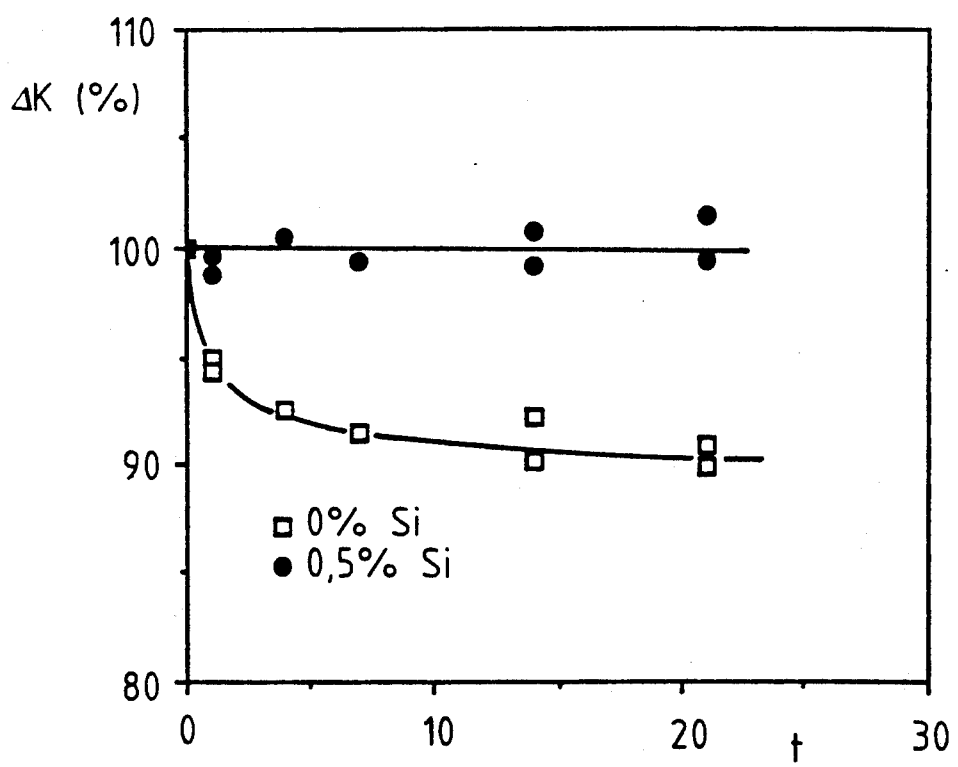
FIGS. 1-4 graphically set out the aging behavior on storage in air at 50° C. of various pigments prepared as described in the Examples.

The isoelectric point of the material, determined in water, is pH 6.3. The aging behavior of the material on storage in air at 50° C. is shown in FIG. 1, in which the decrease in the coercive force Hc as a percentage of the initial value ΔK [%] is plotted against the time t in days (measurement points 0.5% Si). FIG. 1 shows the results of two independent series of measurements.

COMPARATIVE EXPERIMENT 1

The procedure described in Example 1 was followed, except that the moist filter cake was dried directly under nitrogen without additional treatment with water-soluble silicates.

The powder obtained is characterized by the following data:
Hc 54.8 kA/m;
$S_{N2}$: 37.9 m$^2$/g.

The isoelectric point of the pigment, determined in water, is pH 9.2. The aging behavior on storage in air at 50° C. is shown in FIG. 1 (measurement points 0% Si). FIG. 1 shows the results of two independent series of measurements.

EXAMPLE 2

65 g of a berthollide gamma-Fe$_2$O$_3$ having an Fe$^{2+}$ content of 11.0% by weight were dispersed in 250 ml of water. The suspension obtained was brought to pH>12 with 152 ml of concentrated NaOH and heated to 50° C. while passing through nitrogen. At this temperature, 12.94 g of FeSO$_4$.7H$_2$O, dissolved in 30 ml of water, were added and stirring was continued for 1 hour at 50° C. Thereafter, the mixture was cooled and, on reaching 35° C., 16.18 g of FeSO$_4$.7H$_2$O, dissolved in 50 ml of water, and 12.41 g of CoSO$_4$.7H$_2$O, dissolved in 30 ml of water, were added. A changeover was made to gassing with air while cooling further, and oxidation was carried out for 3 hours. The suspension was then heated for 1 hour at 80° C. while blanketing with nitrogen, after which it was filtered and washed neutral.

The filter cake obtained was divided up. One half of it was redispersed in 400 ml of water and 3.06 g of waterglass solution (SiO$_2$ content 26.5%) in 50 ml of water were added, stirring was continued for 15 minutes, and the solid was filtered off and washed. The resulting product was dried under nitrogen.

The powder obtained is characterized by the following data:
Hc: 54.7 kA/m;
$S_{N2}$: 27.4 m$^2$/g.

Figure 2:
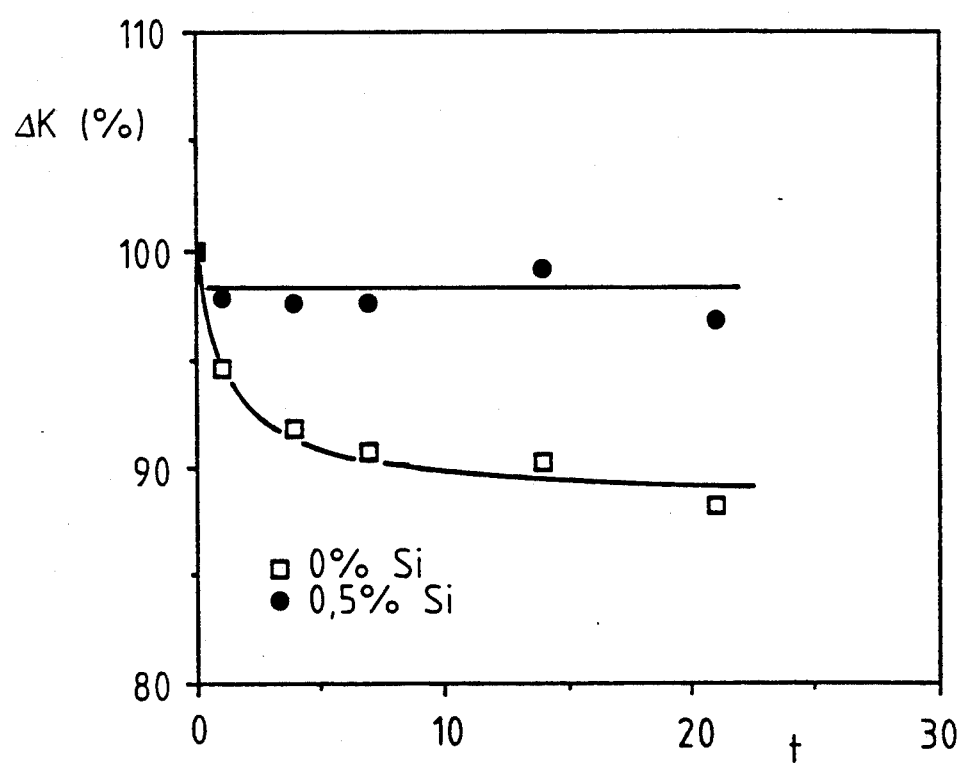

The isoelectric point of the material, determined in water, is pH 5.5. The aging behavior on storage in air at 50° C. is shown in FIG. 2 (measurement points 0.5% Si).

COMPARATIVE EXPERIMENT 2

The second half of the powder obtained in Example 2 was dried directly under nitrogen without additional treatment with water-soluble silicates.

The powder obtained is characterized by the following data:
Hc: 54.8 kA/m;
$S_{N2}$: 30.4 m$^2$/g.

The isoelectric point of the material, determined in water, is pH 9.5. The aging behavior on storage in air at 50° C. is shown in FIG. 2 (measurement points 0% Si).

COMPARATIVE EXPERIMENT 3

The effect of Mn and Zn coatings on the isoelectric point of the pigments and the stability of their magnetic properties was investigated by the method stated in DE-A-33 12 243.

For this purpose, 75 g of the gamma-Fe$_2$O$_3$ used in Example 1 were dispersed in 350 ml of water, and the dispersion was brought to pH>12 with 50 ml of concentrated NaOH and was heated to 50° C. while passing through nitrogen. At this temperature, 14.93 g of FeSO$_3$.7H$_2$O, dissolved in 35 ml of water, were added and stirring was continued for 1 hour at 50° C. The mixture was then cooled and, on reaching 35° C., 18.67 g of FeSO$_2$.7H$_2$O, dissolved in 50 ml of water, and 14.32 g of CoSO$_4$.7H$_2$O, dissolved in 30 ml of water, were added A changeover was made to gassing with air while cooling further, and oxidation was carried out for 3 hours.

Thereafter, 0.46 g of MnSO$_4$.H$_2$O, dissolved in 50 ml of water, was added at 40° C. while blanketing with nitrogen, and stirring was continued for 1 hour at 40° C. while continuing to blanket with nitrogen. The product was filtered off, washed neutral, and dried under nitrogen.

Samples having other manganese contents and samples having different Zn contents were also prepared in a similar manner. The amounts of materials used for coating and typical powder properties of the resulting pigments are shown in the Table.

TABLE

|  | Coated with | Hc | IEP | S$_{A2}$ |
|---|---|---|---|---|
| Comp. Expt. 3-1 | 0.46 g of MnSO$_4$.H$_2$O | 48.2 | — | 36.0 |
| Comp. Expt. 3-2 | 2.31 g of MnSO$_4$.H$_2$O | 50.5 | 7.3 | 33.5 |
| Comp. Expt. 3-3 | 4.62 g of MnSO$_4$.H$_2$O | 50.0 | — | 36.4 |
| Comp. Expt. 3-4 | 0.66 g of ZnSO$_4$.7H$_2$O | 49.1 | 8.5 | 37.4 |
| Comp. Expt. 3-5 | 3.30 g of ZnSO$_4$.7H$_2$O | 47.9 | — | 35.0 |
| Comp. Expt. 3-6 | no coating | 49.3 | — | 36.3 |

Figure 3:
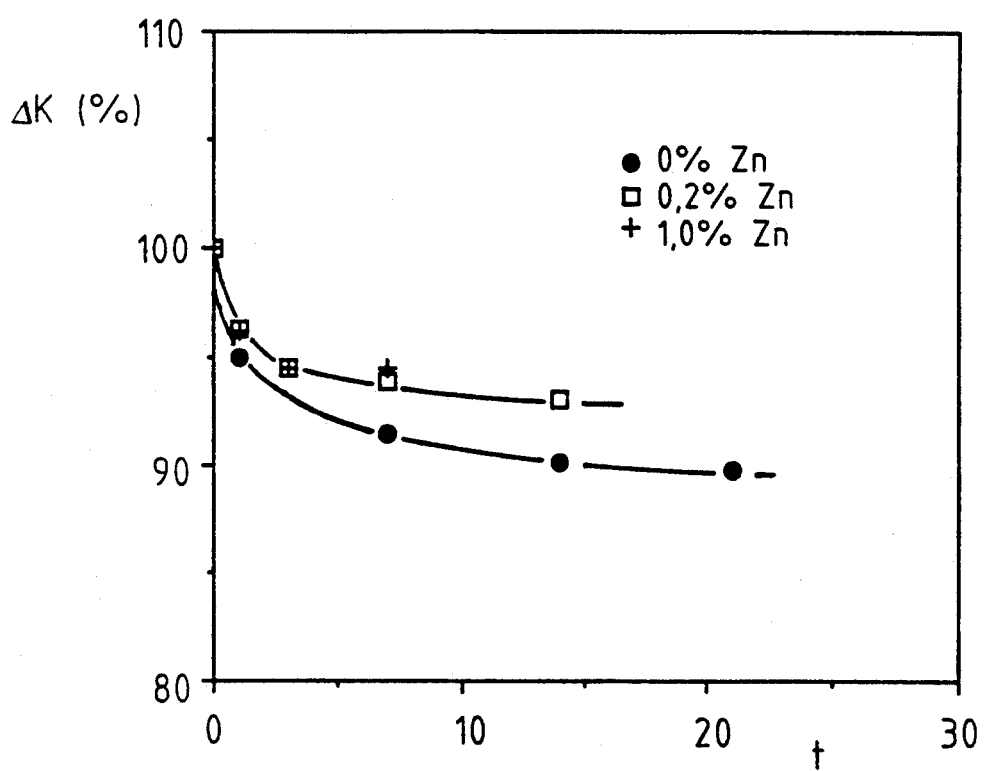
Figure 4:
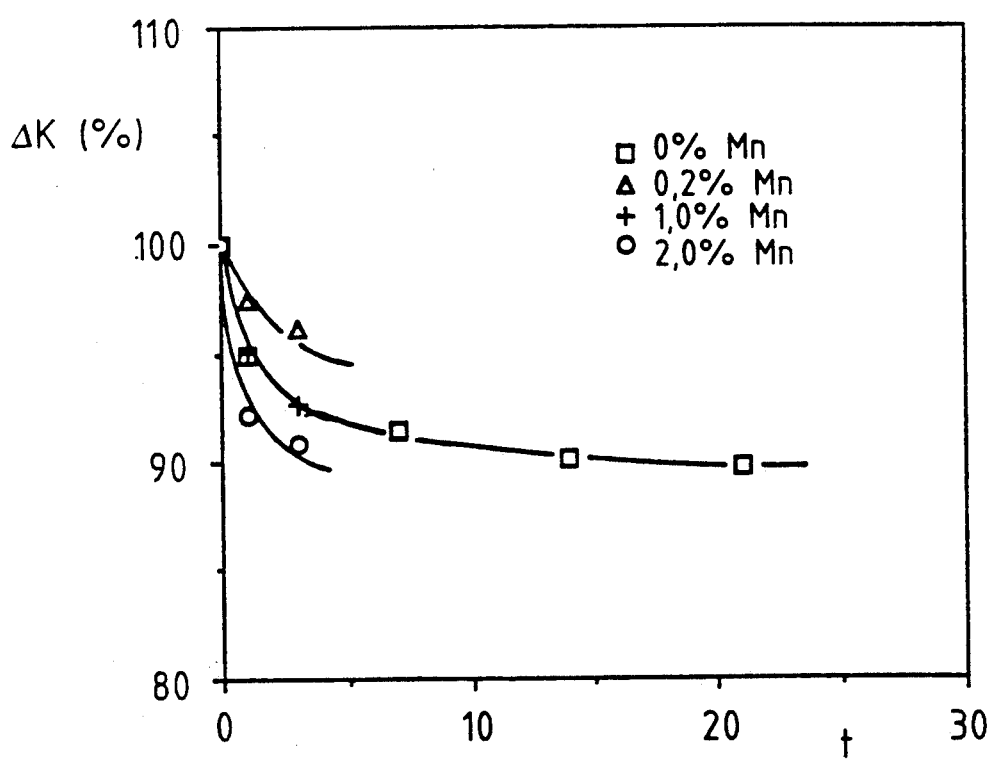

The aging behavior of the corresponding materials on storage in air at 50° C. is shown in FIGS. 3 and 4.

We claim:
1. An acicular, cobalt-modified iron oxide consisting of a core of an iron oxide of the formula FeO$_x$ where x is from 1.33 to 1.5 and ferrite shell which contains a total amount of from 0.4 to 12% by weight of cobalt ions and not more than 5% by weight of iron(II) ions, the percentages being based on the total amount of the material, wherein this cobalt-modified iron oxide has an alkali metal silicate adsorbed on its surface and an isoelectric point corresponding to pH $\leq$ 6.5 and the coercive force decreases by less than 5% after storage in air for 21 days at 50° C.

2. A process for the preparation of an acicular, cobalt-modified iron oxide as claimed in claim 1, wherein an acicular, cobalt-modified iron oxide consisting of a core of an iron oxide of the formula FeO$_x$ where x is from 1.33 to 1.5 and a ferrite shell which contains a total amount of from 0.4 to 12% by weight of cobalt ions and not more than 5% by weight by iron(II) ions, the percentages being based on the total amount of the material, is dispersed in water, a dilute solution of an alkali metal silicate containing not more than 1% by weight of silicon based on the iron oxide to be treated, is added to the vigorously stirred suspension and the resulting material is filtered off, washed with water and dried in an inert gas atmosphere.

* * * * *